June 28, 1949.  G. A. WAHLMARK  2,474,706
HYDRAULIC TRANSMISSION

Filed Jan. 29, 1944  4 Sheets-Sheet 1

INVENTOR.
Gunnar O. Wahlmark,
BY
his Atty.

Patented June 28, 1949

2,474,706

UNITED STATES PATENT OFFICE 2,474,706

HYDRAULIC TRANSMISSION

Gunnar A. Wahlmark, Rockford, Ill., assignor to Sundstrand Machine Tool Co., Rockford, Ill., a corporation of Illinois Application January 29, 1944, Serial No. 520,195

18 Claims. (Cl. 60—53)

1

The invention relates, generally, to hydraulic transmissions, and, more particularly, to a hydraulic transmission wherein the speed of one shaft may be varied with respect to the other.

It is the general object of the invention to provide a new and improved transmission of this type.

Another object is to provide such a transmission embodying control means for automatically maintaining the speed of the output shaft constant while the speed of the input shaft varies.

Another object is to provide a hydraulic transmission adapted for driving an alternator or the like, the transmission deriving its power from a source, the speed of which varies over a relatively wide range, together with control mechanism for maintaining the output shaft speed of the transmission substantially constant.

Another object is to provide such a hydraulic transmission for driving alternators at a speed of approximately 6000 R. P. M. while the speed of the input shaft of the transmission may vary from about 2000 R. P. M. to 8000 R. P. M., or more.

Another object is to provide a hydraulic transmission embodying a rotatable cylinder block containing an annular series of pump cylinders and an annular series of motor cylinders in opposed relation, a driven shaft carrying a wobbler for the motor pistons, and a swash plate for the pump pistons adjustable to vary the stroke thereof and to reverse the direction of pump output.

Another object is to provide in a hydraulic transmission, wherein some of the fluid, for example, oil, is used for lubricating purposes, a means for separating the foam from the oil returning to a sump.

Another object is to provide a hydraulic transmission embodying a pump and a motor and an oil reservoir, together with means for supercharging the reservoir for insuring efficient operation under all atmospheric conditions.

Another object is to provide a new and improved hydraulic transmission particularly adapted for operation at high speeds.

Other objects will become readily apparent from the following detailed description taken in connection with the accompanying drawings wherein:

2

In the exemplary disclosure made in the drawings, the invention is embodied in a transmission designed for employment in driving a device at a constant speed from a power source, which, of necessity, varies widely in speed. Generally, the transmission has an input or driving element 21 adapted for connection to the power source, an output or driven element 22 adapted for connection to the device to be driven, a hydraulic power and speed conversion unit HU, and means, generally designated 23, for varying the operation of the transmission to obtain a constant speed of the driven element 22 though the driving element 21 varies either above or below the speed of the driven element. By way of example, the device to be driven at a constant speed may be an alternator, such as a 400-cycle, 8-pole alternator (not here shown), and herein the driven element 22 is arranged to run at a constant speed of 6000 R. P. M., while the drive element 21 varies in speed from 2100 R. P. M. to 8000 R. P. M., or more. Control means is provided constantly and automatically to govern the means 23 to produce a constant speed of the driven element 22 regardless of the speed at which the driving element 21 is driven by the power source. Forming an essential part of such control means is a hydraulic means 27 operatively associated in controlling relation with the transmission varying means 23, and in turn controlled by speed responsive means including a valve means 28.

Figures 5, 6:
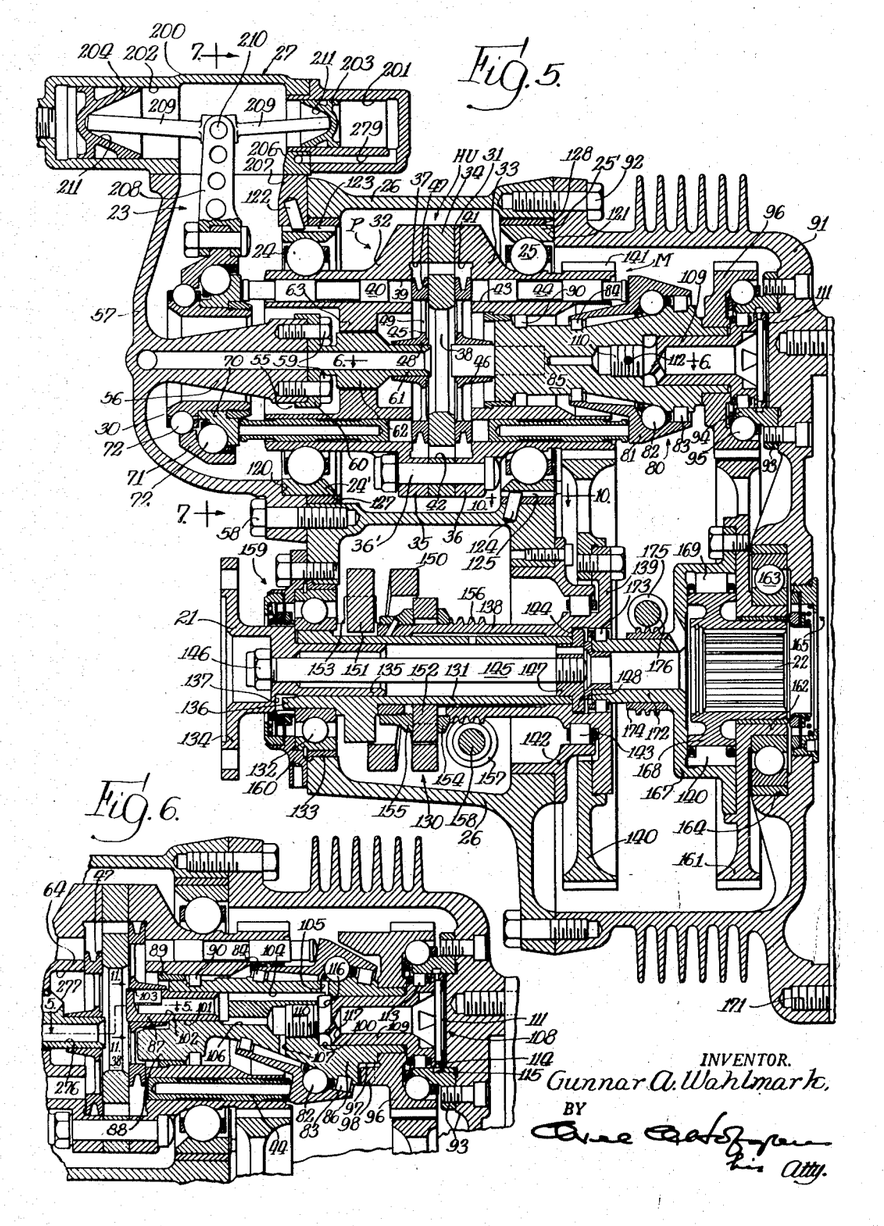
Fig. 5 is a horizontal section taken approximately along the line 5—5 of Fig. 1, the section at the valves of the pump and motor being offset, as best indicated by the line 5—5 of Fig. 6.
Fig. 6 is a fragmentary section along the line 6—6 of Fig. 5.

As above stated, and as best seen in Fig. 5, the transmission includes the hydraulic power and speed conversion unit HU. This unit in turn is comprised of a pump P and a motor M, each of the reciprocatory piston type, with the pump having a wobbler 30 adjustable varying amounts to either side of neutral position so as to vary the direction as well as the quantity of fluid discharged from the pump to the motor. The hydraulic conversion unit, as here shown, is of the rotatable barrel or cylinder block type, and has the pump as well as the motor cylinders formed in the same rotatable cylinder block 31. Such a construction permits of readily obtaining rotation of the motor shaft at a speed either above or below that of the cylinder block, and hence of obtaining a constant speed of the motor shaft regardless of the rate of rotation of the cylinder block, by adjustment of the wobbler 30. Adjustment of the wobbler 30 with respect to neutral determines whether the motor shaft is driven faster or slower than the cylinder block 31, and the extent that the wobbler 30 is swung from its neutral position determines the differential between the speeds of the cylinder block and the motor shaft, the pump and the motor parts being locked and the cylinder block and the motor shaft rotating at the same speed when the wobbler is in neutral position.

The rotatable cylinder block 31 comprises a pump block 32, a motor block 33 and an annular spacer plate 34. The pump and motor blocks are, as seen in Fig. 5, assembled in line so as to maintain the outside diameter of the block 31 a minimum, adapting the unit for high speed operation in which centrifugal forces are kept at a minimum. The pump block and the motor block are secured in end to end relationship, spaced only by the plate 34. To that end, the blocks 32 and 33 are formed respectively with radially outwardly extending flanges 35 and 36, and passing through these flanges and through the plate 34 are a plurality of bolts 36' by means of which the named parts are secured together in fluid-tight relationship.

The cylinder block 31 is rotatably supported in two sets of ball bearings 24 and 25. The inner race for the bearings 24 is formed in the outer surface of the pump block 32, while the inner race for the bearings 25 is likewise formed in the outer surface of the motor block 33. The outer race for each set of bearings 24 and 25 is formed in annular rings 24' and 25', respectively, which are mounted in suitable openings of a central section 26 forming part of the housing of the transmission. The face of the pump block 32 adjacent the plate 34 is formed with a shallow, circular recess 37 which with the plate 34 forms a valve chamber at all times in free communication with a chamber 38 formed by the center of the annular plate 34. Also formed in the block 32 are a plurality of annularly arranged cylinders 39 disposed parallel with the axis of the hydraulic unit and opening at the left hand end, as viewed in Fig. 5, through the end of the block 32, and opening at the right hand end to the valve chamber 37 spaced radially inwardly from the periphery thereof. The number of cylinders 39 is large, being in the order of eighteen. Reciprocable in each cylinder 39 is a piston 40, preferably hollow to reduce the weight, and operable to project in all positions from the left hand end of the cylinder.

Formed in the corresponding face of the motor block 33 is a shallow, circular recess 41 similar to the recess 37, and likewise forming with the plate 34 a valve chamber in constant communication with the chamber 38. The valve chambers 37 and 41, in addition to being in communication through the chamber 38, are in communication at their peripheries through a plurality of longitudinal passages 42 formed in the plate 34. Also formed in the motor block 33 are a plurality of annularly arranged cylinders 43 disposed parallel with the axis of the hydraulic unit and opening at one end through the right hand end of the block 33, as viewed in Fig. 5, and at the other end opening to the valve chamber 41 spaced radially inwardly from the periphery thereof. Reciprocable in each cylinder 43 is a piston 44, preferably hollow (see Fig. 6) to reduce the weight thereof, and operable in all positions to project from the right hand end of the block 33. The motor cylinders 43, of course, correspond in number to the number of pump cylinders 39.

Operable in the valve chambers 37 and 41 are identical valves 45 and 46 of the wheel type disclosed and claimed in my U. S. Letters Patent No. 2,190,812, dated February 20, 1940. Each valve is composed of a rim 47 of a radial width equal to the diameter of the cylinders 39 and 43, which rim has a close, fluid-tight but sliding fit between the end walls of the valve chamber in which it is located. The rim 47 is connected to and carried by a hub 48 through the medium of spokes 49 which are spaced far apart so as to leave a plurality of apertures opening through the valve and which also are of reduced thickness compared to the rim 47, in order to permit of ready flow of fluid from one side to the other of the valve through the apertures, as well as circumferentially of the valve.

The valves 45 and 46 have a gyratory, as distinguished from a rotary, movement within the valve chamber, serving by such gyratory movement to connect the cylinders in rotational sequence alternately to the periphery of the respective valve chambers outwardly of the rim 47 and to the chambers inwardly of the rim 47, as best seen in Fig. 6, the cylinders being completely closed at the time of reversal in the direction of movement of the corresponding piston. To impart such gyratory movement to the valves, relative to the valve chambers, the valves are given an eccentric mounting. Herein the eccentric upon which the valve 45 is mounted is stationary and comprises a two-part member 55, one part 56 of which is integral with a hollow, generally cup-shaped front closure section 57 secured as by bolts 58 over the opening in the casing section 26 in which the pump end of the cylinder block 31 is journaled. The part 56 extends inwardly from the end wall of the closure 57 axially partially into the annular pump block 32. At its inner end the part 56 has secured thereto, as by bolts 59, a second part 60 terminating in a reduced, eccentric portion 61 projecting into the valve chamber 37. Intermediate its ends, the part 60 has a cylindrical portion 62 with an external diameter just .004 of an inch less than the internal diameter of an inwardly extending annular flange 63 formed intermediate the ends of the pump block 32. This slight clearance seals the chamber 64, formed to the right of the flange 63, as viewed in Fig. 5, sufficiently to maintain therein the required fluid pressure while permitting some fluid, herein oil, to escape to the closure 57 for lubricating purposes. Rotatably mounted on the eccentric portion 61 is the valve 45.

Figure 7:
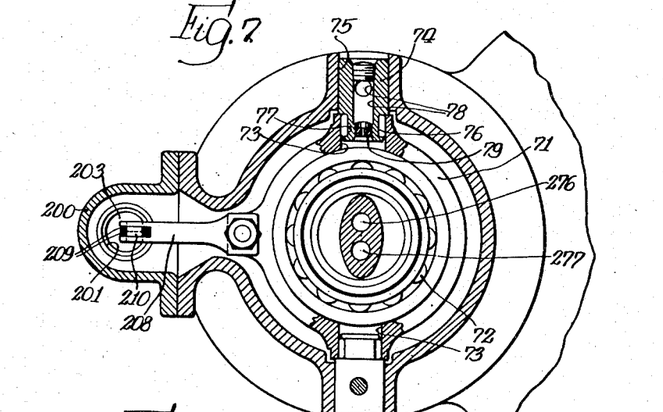
Fig. 7 is a fragmentary transverse section taken along the line 7—7 of Fig. 5.

Completing the pump of the hydraulic unit is the wobbler 30. Inasmuch as the particular construction of the wobbler forms no part of this invention, it is believed sufficient to state that the wobbler comprises an inner, annular member 70 adapted to bear at all times against the left hand projecting ends of the pistons 46 and an outer, annular member 71 within which the inner member 70 is rotatably mounted through the medium of two sets of ball bearings 72. The parts of the wobbler are in conventional, well known manner placed under a preload to take up any play therein. The outer, annular member 71 is, as best seen in Fig. 7, formed with diametrically opposed bores 73 for the reception of trunnions 74 forming a pivotal support for the wobbler. Each trunnion projects through and is secured in a suitable aperture 75 provided in the closure 57. Roller bearings 76 are interposed between the end of the trunnion 74 projecting into the bore 73 and the member 71, and, to that end, the trunnion is formed with an annular groove 77. The trunnion 74 is preferably formed with a lubrication supply passage 78 terminating in a jet plug 79 through which the lubricant is sprayed.

Completing the motor is a swash plate, generally designated 80, comprising an outer, annular member 81 positioned for constant engagement with the right hand projecting ends of the motor pistons 44. The annular member 81 is, through the medium of a thrust ball bearing 82 and two sets of roller bearings 83 and 84, rotatably mounted on a shaft-forming member 85 having an enlarged portion 86 (see Fig. 6). Suitable and complementary raceways, disposed at a fixed inclination to the axis of the shaft-forming member 85, are formed in the outer, annular member 81 and the enlarged portion 86 for the bearings 82, 83 and 84. At its extreme left hand or inner end, as viewed in Fig. 6, the shaft-forming member 85 terminates in an eccentric 87 upon which the valve 46 is rotatably mounted. Counterbalancing the eccentric is a counterweight formed by an enlargement 88 of the member 85. Preferably, a seal ring 89 is interposed between the motor block 33 and the inner end of the shaft-forming member 85 to prevent the loss of fluid from the valve chamber 41.

The member 85 is rotatably journaled at both its inner and its outer ends in suitable bearings. At its inner end, member 85 is journaled in roller bearings 90 mounted within the motor block 33. It outer or right hand end, as viewed in Fig. 5, is supported in a large, rear closure section 91 secured as by bolts 92 to the right end of the intermediate section 26. Internally opposite the end of the member 85 and concentric therewith, the closure 91 has bolted thereto an annular ring 93 with an inwardly projecting flange 94 which, among other things, provides an internal raceway for a thrust ball bearing 95. The outer raceway is formed in a gear 96 fast on the end of the member 85. As best seen in Fig. 6, the member 85 is preferably formed with a notch 97 and the gear 96 with a tongue 98 projecting into the notch to key the member 85 and the gear 96 together. It is believed apparent from the foregoing that the cylinder block 31 constitutes the driving part and that the member 85 constitutes the driven part of the hydraulic unit.

Figure 11:
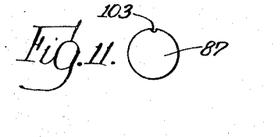
Fig. 11 is an enlarged detail view taken approximately along the line 11—11 of Fig. 6.

As best seen in Fig. 6, the shaft-forming member 85 serves to conduct lubricating fluid to the bearings 82, 83 and 84 and to conduct certain control fluid. To that end, the member 85 is formed with an axial and stepped bore 100 in its outer end and an eccentric bore 101 in its inner end. The eccentric 87 is inserted in the bore 101 and herein is a tube with an L-shaped passage 102 opening through the right hand end of the tube and radially through the side of the tube adjacent the inner or left hand end. The hub 48 of the valve 46, however, closes this radial opening, limiting communication between the passage 102 and the chamber 38 to that provided by a small groove 103 (see Figs. 6 and 11) formed in the end of the tube. From the bore 101 a passage 104 leads to the corner of the larger portion of the stepped bore 100 and, by a radial passage 105, to the thrust bearing 82. A second, longitudinal passage 106 leads from the bore 101 to the end of the smaller portion of the stepped bore 100 and from this smaller portion of the stepped bore a passage 107 leads radially to the space between the member 85 and the outer, annular member 81 of the swash plate intermediate the bearings 82 and 84.

Mounted in the stepped bore 100 is a centrifugal pump 108 for creating static pressure proportional to the speed of rotation of the member 85, that is, the motor shaft. This pump 108 is in the form of a tubular member having a hollow, intermediate portion 109 adapted to fit snugly in the large portion of the bore 100, a reduced threaded portion 110 at its inner end, and an enlarged cup portion 111 at its outer end. The reduced portion 110 is threaded into the smaller portion of the stepped bore 100 and is held against rotation by a pin 112. The cup portion 111 projects into the annular ring 93 and interposed between the cup portion and the flange 94 of the ring 93 are roller bearings 113. Opening radially through the most enlarged portion of the cup 111 are a plurality of apertures 114 communicating with an annular groove 115 formed in the flange 94. The intermediate portion 109 terminates short of the shoulder resulting from the step-down in diameter of the bore 100, thus providing an annular passage 116 with which the passage 104 communicates. Leading from this passage to the interior of the portion 109 is a passage 117.

Figure 10:
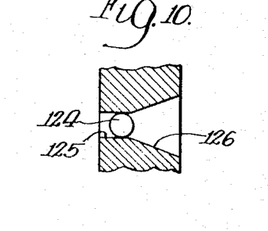
Fig. 10 is a fragmentary sectional view taken along the line 10—10 of Fig. 5.

The closure sections 57 and 91 are formed with radially inwardly extending shoulders 120 and 121, respectively overlying the outer race rings 24' and 25' to prevent shift of the hydraulic unit axially in either direction. To retain the race rings 24' and 25' against rotation, a pin 122 embedded in the closure 57 projects into a slot 123 in the ring 24', while a pin 124 embedded in the section 26 projects into a slot 125 in the ring 25'. To facilitate assembly, each of the slots 123 and 125, as best seen in Fig. 10, is formed with a flaring portion 126 in which the pin is first received. Bushings 127 and 128 are interposed respectively between the outer race ring 24' and the section 26, and the outer race ring 25' and the section 26.

While the block 31 might be driven directly from the power source, it is preferably driven through a drive means 130 designed to prevent the vibration of the power source from being transmitted to the hydraulic unit. Such a drive means comprises a tube 131 rotatably journaled at its outer end in ball bearings 132 mounted in an opening 133 in the front end wall of the intermediate casing section 26. Non-rotatably united with this tube 131 is the driving element 21, which herein is provided with a flange 134 for attachment to the power source, and with a reduced tubular portion 135 adapted to be received snugly within the outer end of the tube 131. To assure that the tube 131 will rotate with the driving element 21, it is formed with a tongue 136 which projects into a slot 137 in the element 21 to key the two together. Rotatably mounted on the tube 131, at its inner end, is a sleeve 138 having a radially outwardly extending flange 139 to which a gear 140 is bolted. This gear meshes with a gear 141 which in the present instance is formed directly on the motor block 33. The sleeve 138 projects through and is journaled in an annular member 142 bolted to the rear end wall of the casing section 26, and interposed between the member and the sleeve 138 are roller bearings 143. The sleeve 138 is formed with an internal, annular shoulder 144 which is substantially flush with the inner end of the tube 131. The tube 131 and the sleeve 138 are held against relative longitudinal separating movement by means of a rod 145, which extends through the driving member 21 and axially of the tube 131 and has nuts 146 and 147 at its outer and inner ends, respectively. The nut 147 has a radial flange 148 extending outwardly beyond the tube 131 to overlie the shoulder 144.

Figures 8, 9:
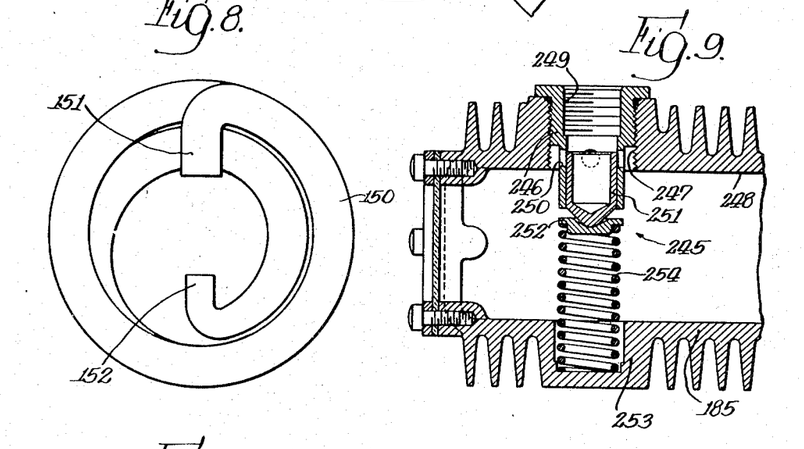
Fig. 8 is an end elevational view of the torsion spring employed in the power drive to the transmission.
Fig. 9 is a longitudinal sectional view of a pressure maintaining valve.

Rotation of and power from the tube 131 is transmitted to the sleeve 138 through the medium of a torsion spring 150. This spring, as best seen in Figs. 5 and 8, is composed of two and one-half turns, of which one and one-half turns are of uniform diameter, while the remaining turn spirals inwardly. The spring terminates at each end in radially inwardly extending portions 151 and 152. The portion 151 is received in a socket 153 formed in the tube 131, while the portion 152 is received in a socket 154 formed in means 155 non-rotatably secured to the sleeve 138. The torsion spring 150 permits of a maximum rotation between the tube and the sleeve of but 15° after which the equivalent of a direct drive is formed.

Formed directly on the sleeve 138 is a worm 156 and meshing with this worm is a worm wheel 157 fast on a shaft 158 of a gear pump GP, which, as will later be more fully described, serves to supply make-up fluid to the hydraulic unit. A rotary seal 159 surrounds the driving element 21 and is secured in position by an annular retainer ring 160 bolted to the front end wall of the casing section 26.

As already described, there is non-rotatably carried on the motor shaft-forming member 85 a gear 96. Herein this gear, which incidentally has the same number of teeth as the gear 141 on the motor block, meshes with a gear 161, herein having the same number of teeth as the gear 140. The gear 161 has an axially extending flange 162 serving as a hub by means of which the gear is rotatably journaled in ball bearings 163 mounted in an appropriate recess 164 formed internally of the end wall of the rear closure 91. A rotary seal 165 is secured in an aperture in the end wall of the rear closure 91 for sealing the housing at this point.

Figures 1, 2:
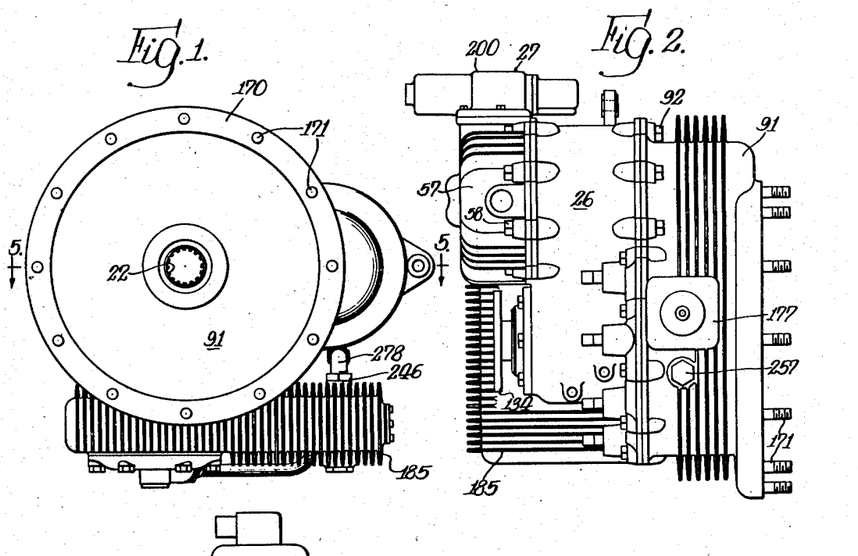
Fig. 1 is an end elevational view of a preferred form of the invention, the figure being taken looking at the right-hand end of Fig. 4.
Fig. 2 is a top plan view thereof.
Figures 3, 4:
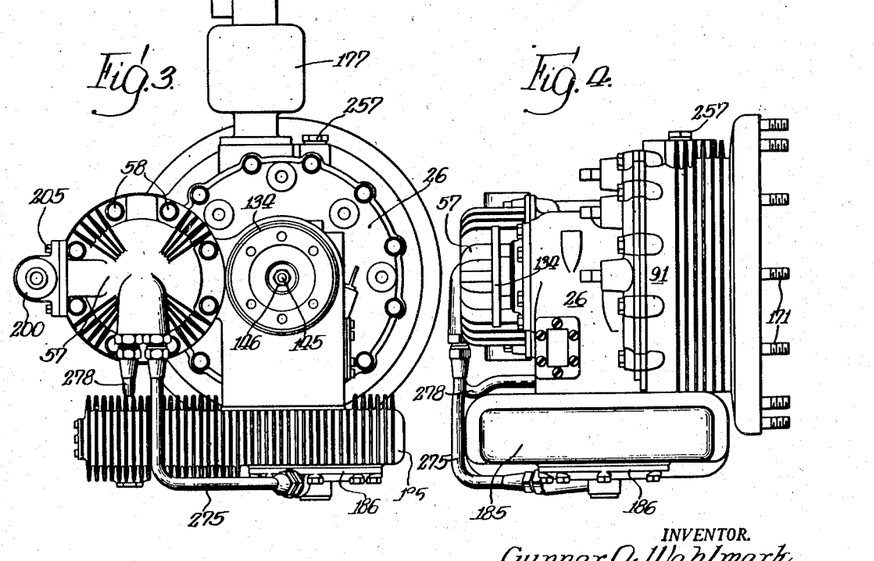
Fig. 3 is an end elevation looking at the left-hand end of Fig. 4.
Fig. 4 is a side elevation.

Bolted to the inner face of the gear 161 is a cup-shaped housing 167 forming the outer and, in this instance, drive member of an overrunning clutch. The inner and driven member of the overrunning clutch is the driven element 22, herein taking the form of a tubular socket internally splined for non-rotatable engagement by axial assembly with the shaft of an alternator or the like to be driven from the transmission. The driven element 22 is provided with a comparatively wide, annular flange 168 for cooperation with rollers 169, in well known manner, to produce an overrunning clutch. The overrunning clutch finds its utility at such times as when a pair of alternators are operating in parallel and one temporarily runs as a motor. To facilitate attachment of the transmission to an alternator or the like, the rear closure section 91, as best seen in Fig. 1, but also shown in Figs. 2, 4 and 5, is formed with an annular, longitudinally facing flange 170 from which project studs 171 threaded at both ends.

The housing 167 is formed with a tubular extension 172 which projects within the flanged end of the sleeve 138. Interposed between the tubular extension 172 and the sleeve 138 are roller bearings 173 to provide additional support for the gear 161 and the parts carried thereby. Non-rotatably mounted on the extension 172 is a worm 174 which meshes with a worm wheel 175 fast on a shaft 176 of a tachometer or speed governor indicated at 177 in Fig. 3.

The gear pump GP above mentioned is of conventional construction (see Fig. 12), having a driving element 180 fast on the shaft 158, a driven element 181 eccentric with respect to the element 180, and a crescent-shaped member 182 partially filling the space resulting from the eccentric arrangement of the gear elements. The pump operates in well known manner when rotated to draw fluid into the pump through an intake port 183 and to discharge fluid through an outlet or discharge port 184. The gear pump is herein located in a fluid sump or reservoir 185 disposed beneath the intermediate casing section 26, as best seen in Figs. 1, 3 and 4. The sump or reservoir is sealed and maintained under a slight pressure, as will presently be more fully described. The gear pump GP is inserted in the sump through an opening formed in the bottom thereof, which opening is closed by a closure plate 186 (see Fig. 4), which also serves to provide a journal for the lower end of the shaft 158. The shaft 158 extends upwardly through the housing 187 of a centrifugal pump 188, hereinafter more fully described, and at its upper end is formed with a socket for the reception of a trunnion 189 projecting inwardly from the casing section 26 to form a journal for the upper end of the shaft 158.

Figure 12:
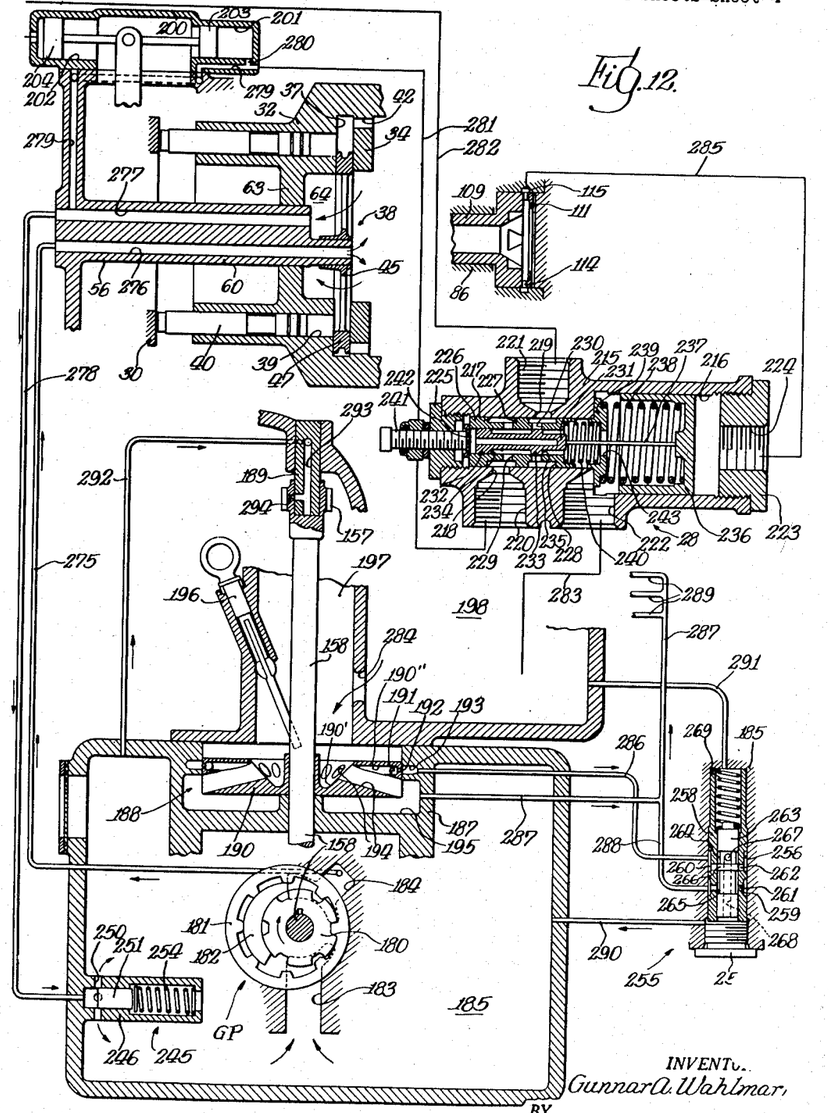
Fig. 12 is a diagram of a portion of the hydraulic circuit.

Also fast on the shaft 158 is the impeller 190 of the centrifugal pump 188. This impeller is of unique construction, designed to separate foamy oil from purely liquid oil and, to that end, has a central, axially and upwardly opening, cup-shaped recess 190'. Leading radially outwardly from the recess 190' are a plurality, herein fourteen are shown, of bores 190'' connected at their outer ends by an annular passage 191. Opening through the periphery of the impeller are a plurality of small, radial apertures 192, one opposite each bore, through which the purely liquid oil is discharged to an annular groove 193 formed in the pump housing 187. The bores 190'' are at right angles to the axis of the impeller. The foamy oil is by large, slightly axially inclined passages 194 discharged to an annular chamber 195 formed in the pump housing. The passages equal the bores in number and intersect the same so as to have a common opening to the recess 190'. An oil level stick 196 projects into the casing just above the pump housing 187. It is to be appreciated that Fig. 12 is diagrammatic and that, in order most clearly to show the paths of the fluid, the physical relationship of certain parts does not conform strictly with that shown in Figs. 1 to 6. The chambers indicated at 197 and 198 represent the bottoms of the intermediate section 26 and the rear closure section 91 to which all oil employed in lubricating the transmission eventually flows.

Having described the transmission, the control for the transmission will now be described. As generally stated above, this control includes the hydraulic means 27 which governs the position of the transmission operation varying means, that is, the wobbler 30. The means 27 comprises a two-part cylinder 200 having a bore 201 at one end and a larger bore 202 at the other end. Operable in the respective bores are opposed pistons 203 and 204. The cylinder is secured, as by bolts 205, to the side of the front closure 57 and has formed in its side an enlarged opening 206 registering with a corresponding opening 207 formed in the side of the closure 57. Secured to the outer, annular member 71 of the wobbler 30 is a bifurcated member 208 projecting through the openings 206 and 207 into the cylinder 200 between the pistons 203 and 204. A piston rod 209 for each of the pistons is pivotally connected as by a pin 210 between the forks of the bifurcated member 208. The opposite end of each piston rod is rounded and bears against the apex of a socket 211 formed on the inside of each of the pistons. The smaller of the pistons 203 is adapted to be constantly acted upon by fluid under a given pressure, and this piston acts to shift the wobbler in such direction as tends to result in reducing the speed of the driven element 22 below the speed of the driving element 21. The piston 204, in turn, is supplied with fluid under pressure at such times and in such quantities as to bring about such operation of the hydraulic unit as will result in a constant speed of the driven element 22 despite variation in speed of the driving element 21.

The fluid acting on the piston 204 is under the control of the valve means 28 which, in turn, is responsive to the speed of the driven element 22 through the medium of the pressure generated by the centrifugal pump 108. The valve means 28 comprises a casing 215 having a longitudinal bore 216 at one end and a bore 217 at the other end which is of smaller diameter. Opening to the bore 217 are a pair of ports 218 and 219 spaced longitudinally of the bore, each port having a threaded enlargement 220 and 221, respectively, for the reception of a conduit. A third port, 222, also threaded for the reception of a conduit, opens to the bores at the juncture thereof. Closing the open end of the larger bore 216 is a cap 223 having a threaded port 224 formed therein, while closing the open end of the smaller bore 217 is a threaded cap 225.

Slidable in the bore 217 is a sleeve 226 formed with a pair of annular recesses 227 and 228 in constant communication respectively with the ports 218 and 219. The annular recesses are made comparatively wide so as to permit of longitudinal adjustment of the sleeve 226 without breaking communication between the recesses and the ports, while leading from the recesses 227 and 228 to the interior of the sleeve are a plurality of radial ports 229 and 230, respectively, these radial ports being substantially narrower than the annular recesses. In turn slidable within the sleeve 226 is a spool valve 231 formed with a land 232 at the left hand end, as viewed in Fig. 12, and with a land 233 spaced inwardly somewhat from the right hand end of the valve so as to form a wide, annular groove 234 intermediate the two lands and an open-sided groove 235 to the right of the land 233 opening to the bore 217. The land 233 is given a width exactly equal to the diameter of the radial ports 230 so that, in the position shown in Fig. 12, the ports are completely closed and slight movement of the spool valve relative to the sleeve in either direction will open the ports 230.

Slidable in the bore 216 is a piston 236 which is by a rigid wire or rod 237 connected to the valve 232 so as to impart to the valve the movements of the piston. A compression spring 238 is interposed between the piston and a plate 239, which bears against the shoulder formed in the valve casing at the juncture of the bores 216 and 217, thus constantly urging the piston 236 to the right, as viewed in Fig. 12. The sleeve 226 is constantly urged to the left by compression spring 240 which is interposed between the plate 239 and the end of the sleeve. The position of the sleeve 226 is determined by an adjusting screw 241 which is threaded through the cap 225 and at its inner end bears against a disk 242 engaging the sleeve 226. The spring 240 is weaker than the spring 238 so that the plate 239 always remains seated on the shoulder formed between the bores, and hence adjustment of the screw 241 determines the position of the sleeve 226 and thereby determines the pressure acting on the piston 236 which will maintain the valve 232 in a position closing the ports 230. The plate 239 is provided with a central aperture 243 so as to permit fluid from groove 235 to reach port 222.

Also forming a part of the control is the pressure maintaining valve means, generally designated 245. This valve means is shown diagrammatically in Fig. 12, and in actual construction in Fig. 9. The valve means is located in the revervoir 185 and, as best seen in Fig. 9, comprises a casing in the form of a sleeve 246 which is inserted in an opening 247 formed in the top wall 248 of the reservoir 185. The sleeve is threaded internally at its outer end to form a port 249 for the reception of a conduti, and intermediate its ends is formed with a plurality of radial ports 250 opening to the interior of the reservoir. Slidable in the sleeve in a position to control the ports 250 is a cup-shaped valve 251 which bears at its closed inner end against a washer 252. Interposed between the washer 252 and the bottom wall 253 of the reservoir 185 is a compression spring 254. The valve is designed to maintain a pressure of approximately two hundred pounds per square inch.

Forming a part of the hydraulic system but not strictly part of the control system is a reservoir charging valve means, generally designated 255, shown in Fig. 12. The purpose of the valve means 255, as will later become more apparent, is to maintain the reservoir 185 supercharged to a pressure of approximately five pounds per square inch, so as to assure proper operation of the gear pump GP under any and all atmospheric conditions. The valve means is housed in the reservoir 185, which for that purpose is formed with a bore 256. The bore is not open at its inner end (the top end, as viewed in Fig. 12), and at its opposite or outer end is closed by a plug 257. Received snugly in the bore is a sleeve 258 formed with annular, external grooves 259 and 260, and communicating with these grooves are a plurality of radial ports 261 and 262, respectively. Slidable within the sleeve 258 is a spool valve 263 formed with an annular recess 264 and an annular recess 265 separated by a land 266 which is of a width equal to the diameter of the ports 262. The groove 265 is of such width and the ports 261 and 262 are so spaced longitudinally of the sleeve that the groove 265 is, in a certain position of the valve 263, capable of bridging the ports 261 and 262 to effect communication therebetween. Groove 264 is, through a radial port 267, in constant communication with a longitudinal passage 268 opening through the lower end of the valve, as viewed in Fig. 12, to discharge to the bore 256. The valve 263 is constantly urged downwardly, as viewed in Fig. 12, by a compression spring 269 interposed between the closed end of the bore and the valve.

As most readily seen from Fig. 12, the various units of the transmission and the control therefor are all connected in a properly integrated hydraulic circuit. In part the circuit is formed by passages within the various casing structures, while other parts are formed by external piping. Where the term "conduit" is used hereinafter, it is intended to mean either such internally formed passages or external piping.

The source of the fluid in the circuit is the gear pump GP which, as already stated, is located in the reservoir 185. Upon operation, the gear pump draws fluid from the reservoir through its intake port 183 and discharges the same under pressure to its discharge port 184. Leading from the port 184 to the chamber 38 is a conduit composed in part by an external pipe 275 and in part by a passage 276 formed in the member 55, the passage 276 passing through the eccentric extension 61 and opening through the end thereof. Conventionally, make-up fluid is supplied as by the gear pump GP to the hydraulic unit merely to compensate for the fluid lost by leakage, the pump and motor of the hydraulic unit being otherwise connected in a closed circuit. However, at the high speeds at which the transmission herein disclosed is intended to be operated, the fluid, if constantly recirculated in a closed circuit, becomes excessively heated and, therefore, a construction is provided herein whereby the hydraulic unit is constantly cooled by fluid circulating therethrough. To that end, provision is made whereby fluid greatly in excess of the fluid actually circulated through the pump P and motor M is supplied to and mingled with the fluid discharged from the motor, thereby permitting fluid at an appropriate temperature to be drawn into the pump. This excess fluid is derived from the gear pump GP through the conduit above described and fills the chamber 38, the valve chambers internally of the rims 47 of the valves, and the chamber 64. The excess fluid is returned to the reservoir through a conduit formed in part by a passage 277 formed in the tubular member 55 parallel with the passage 276, and in part by an external pipe 278. The passage 277, as best seen in Fig. 6, opens to the chamber 64 through the beveled face of the cylindrical enlargement 62, while the pipe 276 is at its remote end threaded into the port 249 of the pressure maintaining valve means 245. This valve means, as already stated, maintains, in the circuit just described, a pressure of approximately two hundred pounds per square inch. As a further aid in cooling, fins are formed on various parts of the transmission casing, particularly the reservoir.

Branching from the passage 277 to supply the control fluid is a passage 279 opening through a port 280 to the smaller cylinder 201, so as constantly to act on the piston 203 tending to tilt the wobbler 30 to reduce the speed of the driven element. From the passage 279 a conduit 281 leads to the port 218, while a conduit 282 leads from the port 219 to the larger cylinder 202. A conduit 283 leads from the port 222 to the sump in the intermediate casing section 26 from whence oil flows through an aperture 284 to the centrifugal pump 188 serving as a separator of the foamy oil from the purely liquid oil. To actuate the valve means 28, a conduit 285 is connected between the port 224 of the valve and the annular groove 115 of the centrifugal pump 108. It will be apparent, from what has been stated before, that not only the oil returned through the conduit 283, but all lubricating oil as well, will eventually find its way to the pump 188. In other words, the oil that is forced out through the clearance between the cylindrical enlargement 62 and the flange 63, and that which flows out through the groove 103, bore 102, passages 104 and 105, and passages 106 and 107, as well as other oil used for lubricating purposes, as will presently be made apparent, all finds its way back to the pump 188 where the purely liquid oil is separated from the foamy oil.

The separated, purely liquid or foamy oil is under the control of the valve means 255, and, to that end, a conduit 286 leads from the groove 193 in the pump housing 187 to the groove 260 in the sleeve 258. A conduit 287 leads from the chamber 195 in the centrifugal pump housing and terminates in a plurality of jets or nozzles 289 from which oil is sprayed onto various parts of the transmission. A conduit 288 branches from the conduit 287 and leads to the groove 259 in the sleeve 258. A conduit 290 is connected to the bore 256 intermediate the end of the sleeve 258 and the plug 257 and at the other end communicates with the interior of the reservoir 185. To conduct any leakage fluid that may accumulate in the upper end of the sleeve 258, as viewed in Fig. 12, a conduit 291 is connected between the upper end of the sleeve 258 and the chamber or sump 198. Completing the structure is an air bleed conduit 292 connected at one end to the top of the reservoir 185, and connected at the other end to a passage 293 formed in the trunnion 189. The passage 293 in turn communicates with a very small bleed opening 294 opening radially through the worm wheel 157.

Having described the transmission and its controls, the operation thereof will now be described. Let it be assumed that power is being supplied to the transmission through the driving element 21, and, moreover, that the element is at the particular time being driven at the desired rate of the driven element 22 that is to be maintained, that is, for example, 6000 R. P. M. Under this assumption the wobbler 30 will be in its neutral position so that the hydraulic unit is operating as a unit, that is, with the motor driven at the same rate as the cylinder block 31. If now it is assumed that the power source increases its speed to drive the element 21 at a rate in excess of 6000 R. P. M., the driven element 22 would also be driven at this excess rate unless compensation is made. Such compensation would, however, be automatically made herein, for, as the speed of the motor shaft-forming member 85 tends to increase above that speed which results in 6000 R. P. M. of the driven element 22, the pressure generated by the centrifugal pump 108 will also rise. This increased pressure supplied to the cylinder 216 through the conduit 285 will act on piston 236 and shift the same to the left, as viewed in Fig. 12, and with it shift the valve 231 to the left resulting in an uncovering of the ports 230.

As a consequence, fluid will flow out of the cylinder 202 through the conduit 282, port 219, groove 228, ports 230, groove 235, opening 243, port 222, and conduit 283 to the sump or chamber 198. With the fluid thus relieved in the cylinder 202, the constantly acting fluid in the cylinder 201 will, through the piston 203, tilt the wobbler 30 out of its neutral position in a counterclockwise direction, as viewed in Fig. 5, to, cause the motor M to operate at a speed less than the cylinder block 31. The extent of tilt of the wobbler 30 is, of course, dependent upon the degree to which the element 21 is driven above the constant speed of 6000 R. P. M. desired to be maintained, and when the point is reached where the shaft 85 of the motor M is again driven at such speed as will produce 6000 R. P. M. of the driven element 22, the pressure generated by the centrifugal pump 108 will again be that assumed for the initial condition, and thus the piston 236 and the valve 232 will be restored to the position shown in Fig. 12, blocking the ports 230 and thus maintaining the wobbler 30 in the adjusted position.

Should the power source, on the other hand, drive the element 21 at a rate lower than the desired rate of 6000 R. P. M., the pressure generated by the centrifugal pump 108 would drop a corresponding amount, as a result of which the piston 236 would move to the right, as viewed in Fig. 12, carrying the valve 232 with it. This would cause fluid under pressure to be supplied to the large cylinder 202, and the fluid, acting on the larger area of piston 204, overcomes piston 203 and tilts the wobbler 30 in a clockwise direction, as viewed in Fig. 5, from its neutral position. Here again the tilt of the wobbler is proportional to the drop in speed of the element 21, so that the motor M is now driven at a sufficiently higher rate than the cylinder block 31 as will result in a speed of 6000 R. P. M. of the driven element 22. As the speed of the driven element reaches the constant speed desired to be maintained, the pressure generated by the centrifugal pump 108 will again be that assumed in the initial condition and thus the piston 236 will be shifted to the left restoring the valve 232 to the position shown in Fig. 12, wherein the supply of fluid under pressure to the cylinder 202 is again cut off.

Under all conditions, make-up and control fluid is being supplied by the gear pump GP, which is driven from the sleeve 138. The quantity of fluid supplied by the gear pump to the hydraulic unit HU is far in excess of that required merely to compensate for leakage fluid. This excess fluid mingles with the fluid discharged from the motor M, with the result that the fluid drawn into the pump P is composed of a certain proportion of the fluid discharged from the motor and a certain proportion of make-up fluid, so that the temperature of the resultant fluid is maintained at a desired low level. The leakage fluid and the fluid that is purposely permitted to flow out from the valve chambers onto the moving parts of the transmission, and the fluid that is exhausted from the cylinder 202, finds its way into the chamber 198 and from there to the centrifugal pump 188 designed to act as a separator of purely liquid and foamy fluid. So long as the pressure in the reservoir 185 is maintained at approximately the five pounds per square inch desired, the valve 263 will assume the position shown in Fig. 12, namely, the position wherein the land 266 closes the radial ports 262 so as to block any flow of fluid from the conduit 286. Should the pressure in the reservoir 185 drop, the valve 263 will be moved downwardly under the influence of spring 269 causing radial ports 262 to be uncovered and placed in communication with the groove 264, thereby permitting pure liquid to flow from conduit 286 through annular recess 260, radial ports 262, groove 264, radial port 267 in the valve, longitudinal passage 268, and thence through conduit 290 to the reservoir 185. As this flow of liquid builds the pressure in the reservoir to the desired value, the valve 263, under the influence of that pressure acting on the lower end of the valve, as viewed in Fig. 12, shifts the same upwardly again to block the radial ports 262. The foamy oil is at all times discharged through conduit 287 and the jets 289. At such time when the valve 263 closes the radial ports 262, the pure liquid that can now not flow through the conduit 286 simply spills out of the bores 190'' of the impeller 190 into the passages 194, to be discharged with the foamy oil. Should the pressure in the reservoir 185 by chance build up in excess of five pounds per square inch, and, as a result, move the valve 263 upwardly beyond the point where the land 266 closes the ports, the pure liquid would simply flow along the groove 265 in the valve 263 and thence outwardly through radial ports 261, groove 259 and branch conduit 288 to the conduit 287, still to be discharged as lubricating oil through the jets or nozzles 289.

As already pointed out, the pump and motor of the hydraulic unit are opposed and in line so that the outside diameter of the cylinder block 31 may be a minimum and the centrifugal forces resulting from the high speeds of operation for which the unit is designed may, likewise, be a minimum. Also, contributing to the ability of the transmission to operate at the high speeds mentioned is the torsion spring drive whereby the transmission of vibrations of the power source to the transmission is prevented. Likewise, vibration within the transmission itself, and particularly the hydraulic unit, is, where possible, reduced. To this end, the hydraulic unit is so designed that there is a constant pressure urging the cylinder block 31 to the left, as viewed in Fig. 5, so as to prevent the same from vibrating back and forth. This constant urging of the cylinder block to the left results from the fact that the inwardly projecting, annular flange 63 in the pump block 32 gives to the pump block a larger pressure area acted upon by the make-up fluid than is present on the motor block 33, hence this constant urging of the cylinder block to the left. The thrust of the pistons on the wobbler and the swash plate is, of course, opposed and substantially neutralized.

Further, it is believed apparent from the foregoing description that the unit transmission herein disclosed readily and accurately maintains constant the speed of the driven element despite variations in the speed of the driving element. The transmission is adapted for a great variety of uses and under a great variety of conditions, including rarefied atmospheric conditions, with proper operation, particularly of the make-up pump, still assured because of the supercharging of the reservoir. The rotatable parts of the transmission are adequately lubricated. While the same fluid is employed for lubrication, control and force transmitting purposes, the fluid employed for control and force transmitting purposes is maintained purely liquid and free of air bubbles which are compressible and reduce the efficiency of operation of a hydraulic unit.

While the invention has been disclosed and described herein in a particular embodiment, it is not intended that the invention is to be limited thereby to the specific disclosure made. On the contrary, it is intended to cover all modifications and alternative constructions falling within the spirit and scope of the invention as defined in the appended claims.

I claim as my invention:

1. In a transmission, a driving element, a driven element and hydraulic means operatively interposed between said elements comprising a rotatable cylinder block driven by said driving element and having a first plurality of annularly arranged cylinders and a second plurality of annularly arranged cylinders formed therein, the first and second plurality of cylinders being in line and having the same axis, a piston reciprocable in each of the cylinders to form a pump and a motor, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, and valve means for controlling the flow of fluid to and from the pump and motor cylinders permissibly rotatable with said cylinder block.

2. In a transmission, a driving element, a driven element and hydraulic means operatively interposed between said elements comprising an elongated rotatable cylinder block driven by said driving element and having a pump block and a motor block mounted in end to end relationship, a first plurality of annularly arranged cylinders formed in said pump block and opening through each end thereof, a second plurality of annularly arranged cylinders formed in said motor block and opening through each end thereof, the first and second plurality of cylinders being in line and having the same axis, a piston in each of the cylinders to form a pump and a motor and operable in all positions to project through the outer end of each cylinder, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, and valve means for controlling the flow of fluid to and from the pump and motor cylinders permissibly rotatable with said cylinder block.

3. In a transmission, a driving element, a driven element and hydraulic means operatively interposed between said elements comprising a rotatable cylinder block driven by said driving element and having a first plurality of annularly arranged cylinders and a second plurality of annularly arranged cylinders formed therein, the first and second plurality of cylinders being in line and having the same axis, a piston reciprocable in each of the cylinders to form a pump and a motor, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, means whereby the cylinder block is constantly urged in one direction, and valve means for controlling the flow of fluid to and from the pump and motor cylinders.

4. In a transmission, a driving element, a driven element and a hydraulic means operatively interposed between said elements comprising an elongated rotatable cylinder block driven by said driving element and having a pump block and a motor block mounted in end to end relationship, a first plurality of annularly arranged cylinders formed in said pump block and opening through each end thereof, a second plurality of annularly arranged cylinders formed in said motor block and opening through each end thereof, the first and second plurality of cylinders being in line and having the same axis, a piston in each of the cylinders to form a pump and a motor and operable in all positions to project through the outer end of each cylinder, means forming valve chambers and interconnecting passageways between said pump and motor blocks adapted for controlled communication with said cylinders, a non-rotatable motion converting means acting on the pump pistons and being adjustable to vary the quantity and direction of fluid discharged from the pump to the motor, a second motion converting means carried by said driven element and acted upon by said motor pistons to convert the rotary motion of said cylinder block and the reciprocatory motion of said motor pistons into rotary motion of said driven element, valve means for controlling the flow of fluid to and from the pump and motor cylinders, means for supplying make-up fluid under pressure to the valve chambers between said pump and motor blocks, and means on one said pump or said motor block adapted in conjunction with the make-up fluid to urge said cylinder block constantly in one direction axially.

5. In a transmission, a driving element, a driven element and hydraulic means operatively interposed between said elements comprising an elongated cylinder block driven by said driving element and having an annular pump block with a concentric circular recess formed in one end thereof, an annular motor block with a concentric circular recess formed in one end thereof and an annular spacer plate, the pump and motor blocks being mounted with their recessed ends in end to end relationship separated by said spacer plate, means for rotatably mounting said cylinder block, a plurality of annularly arranged cylinders formed in each said pump block and said motor block, each cylinder opening at its inner end to the circular recess formed in its respective block and opening through the outer end of its respective block, a piston reciprocable in each cylinder to form a pump and a motor and operable in all positions to project through the outer end of the cylinder in which it is reciprocable, means for supplying make-up fluid under pressure to the recesses in said pump and motor blocks and said spacer plate, means on said pump block and means on said motor block forming opposed pressure areas subject to the make-up fluid with the area on one of said blocks greater than the area on the other, whereby said cylinder block is constantly urged in one direction axially, valve means for controlling the flow of fluid to and from the pump and motor cylinders, a non-rotatable motion converting means acting on the pump pistons and being adjustable to vary the quantity and direction of fluid discharge from the pump to the motor, and a second motion converting means associated with said driven element and acted upon by said motor pistons to convert the rotary motion of said cylinder block and the reciprocatory motion of said motor pistons into rotary motion of said driven element.

6. In a transmission, a driving element, a driven element and hydraulic means operatively interposed between said elements comprising an elongated cylinder block driven by said driving element and having an annular pump block with a concentric circular recess formed in one end thereof, an annular motor block with a concentric circular recess formed in one end thereof and an annular spacer plate, the pump and motor blocks being mounted with their recessed ends in end to end relationship separated by said spacer plate, means for rotatably mounting said cylinder block, a plurality of annularly arranged cylinders formed in each said pump block and said motor block, each cylinder opening at its inner end to the circular recess formed in its respective block and opening through the outer end of its respective block, a piston reciprocable in each cylinder to form a pump and a motor and operable in all positions to project through the outer end of the cylinder in which it is reciprocable, a wheel-like valve in each circular recess controlling the flow of fluid to and from the pump and motor cylinders, a non-rotatable member projecting into said pump block having a cylindrical portion concentric with the axis of said cylinder block and an eccentric extending into the circular recess in said pump block and mounting said pump valve, means for supplying make-up fluid under pressure to the recesses in said pump and motor blocks and said spacer plate, an annular inwardly projecting flange on said pump block surrounding the cylindrical portion of said member giving to said pump block an area subject to the make-up fluid greater than the area on said motor block subject to the make-up fluid whereby the cylinder block is constantly urged in one direction axially, a non-rotatable motion converting means acting on the pump pistons and being adjustable to vary the quantity and direction of fluid discharge from the pump to the motor, and a second motion converting means associated with said driven element and acted upon by said motor pistons to convert the rotary motion of said cylinder block and the reciprocatory motion of said motor pistons into rotary motion of said driven element, said last named means including an eccentric mounting said motor valve.

7. In a transmission, a driving element, a driven element and hydraulic means operatively interposed between said elements comprising an elongated cylinder block driven by said driving element and having an annular pump block with a concentric circular recess formed in one end thereof, an annular motor block with a concentric circular recess formed in one end thereof and an annular spacer plate, the pump and motor blocks being mounted with their recessed ends in end to end relationship separated by said spacer plate, means for rotatably mounting said cylinder block, a plurality of annularly arranged cylinders formed in each said pump block and said motor block, each cylinder opening at its inner end to the circular recess formed in its respective block and opening through the outer end of its respective block, a piston reciprocable in each cylinder to form a pump and a motor and operable in all positions to project through the outer end of the cylinder in which it is reciprocable, a wheel-like valve in each circular recess controlling the flow of fluid to and from the pump and motor cylinders, a non-rotatable member projecting into said pump block having a cylindrical portion concentric with the axis of said cylinder block and an eccentric extending into the circular recess in said pump block and mounting said pump valve, means for supplying make-up fluid under pressure to the recesses in said pump and motor blocks and said spacer plate, an annular inwardly projecting flange on said pump block surrounding the cylindrical portion of said member giving to said pump block an area subject to the make-up fluid greater than the area on said motor block subject to the make-up fluid whereby the cylinder block is constantly urged in one direction axially, the internal diameter of said flange being slightly greater than the external diameter of said cylindrical portion to provide a restricted annular passage through which fluid for lubricating purposes may flow, a non-rotatable motion converting means acting on the pump pistons and being adjustable to vary the quantity and direction of fluid discharge from the pump to the motor, and a second motion converting means associated with said driven element and acted upon by said motor pistons to convert the rotary motion of said cylinder block and the reciprocatory motion of said motor pistons into rotary motion of said driven element, said last named means including an eccentric mounting said motor valve.

8. In a transmission, a driving element, a driven element and hydraulic means operatively interposed between said elements comprising an elongated rotatably mounted cylinder block driven by said driving element and having formed therein a first plurality of annularly arranged pump cylinders, a second plurality of annularly arranged motor cylinders and a plurality of valve chambers and passages interconnecting the pump and motor cylinders, a valve for each plurality of cylinders mounted in said valve chambers, a piston reciprocable in each of said pump and said motor cylinders, means for supplying make-up fluid under pressure to said valve chambers, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, said second motion converting means including a motor shaft-forming member having axial and radial passages formed therein with restricted communication with the valve chambers to receive make-up fluid and an enlarged bore in the end of said member remote from the valve chambers having communication with the axial passage, and centrifugal pump means received partially within the bore in said member for generating fluid pressure proportional to the speed of rotation of said member.

9. In a transmission, a driving element comprising a primary member and a secondary member driven by said primary member a driven element and hydraulic means operatively interposed between said elements comprising an elongated rotatable cylinder block having pump cylinders, pistons and valve means, and motor cylinders, pistons and valve means therein, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, and means for driving said cylinder block from said driving element including a torsion spring interposed between said primary member and said secondary member of the driving element.

10. In a transmission, a driving element, a driven element and hydraulic means operatively interposed between said elements comprising an elongated rotatable cylinder block having pump cylinders, pistons and valve means, and motor cylinders, pistons and valve means therein, a non-rotatable motion converting means acting on the pump pistons and being adjustable to vary the quantity and direction of fluid discharge from the pump to the motor, a second motion converting means including a motor shaft-forming member, means for driving said cylinder block from said driving element comprising a sleeve rotatable relative to said driving element, a torsion spring drivingly connected between said driving element and said sleeve, a gear fast on said sleeve and a gear fast on said cylinder block and meshing with said gear on said sleeve, and means for transmitting the rotary motion of said motor shaft-forming member to said driven element including a gear fast on said shaft-forming member, a final gear meshing with said last named gear, and an overrunning clutch interposed between said final gear and said driven element.

11. In combination, a driving element, a driven element, a hydraulic transmission operatively interposed between said elements including adjustable means for varying the operation of said transmission to obtain a constant speed of said driven element while the speed of said driving element varies above or below the speed of said driven element, means for adjusting said adjustable means comprising a pair of opposed piston and cylinder devices of unequal cross sectional areas, means for supplying fluid under pressure to said devices including pressure-producing means driven by said driving element, means for constantly subjecting the smaller of said piston and cylinder devices to said fluid under pressure, and means for supplying said fluid under pressure to the larger piston and cylinder device including valve means governing the supply of said fluid under pressure to said larger piston and cylinder device, and means responsive to the speed of rotation of said driven element governing said valve means.

12. In combination, a driving element, a driven element, a hydraulic transmission operatively interposed between said elements including adjustable means for varying the operation of said transmission to obtain a constant speed of said driven element while the speed of said driving element varies above or below the speed of said driven element, means for adjusting said adjustable means comprising a pair of opposed piston and cylinder devices of unequal cross sectional areas, means for supplying fluid under pressure to said devices including pressure-producing means driven by said driving element, adjustment of said adjustable means as a result of said fluid under pressure acting on said smaller piston and cylinder device serving to decrease the speed of said driven element relative to said driving element and adjustment of said adjustable means by said fluid under pressure acting on said larger piston and cylinder device tending to increase the speed of said driven element relative to said driving element, means for constantly subjecting the smaller of said piston and cylinder devices to said fluid under pressure, and means for supplying said fluid under pressure to the larger piston and cylinder device including a valve means governing the supply of said fluid under pressure to said larger piston and cylinder device, and means responsive to the speed of rotation of said driven element actuating said valve means to permit said fluid under pressure to be supplied to said larger piston and cylinder device when the speed of said driven element tends to drop below the constant speed to be maintained and to permit fluid discharge from said larger piston and cylinder device when the speed of said driven element tends to exceed the constant speed of said driven element to be maintained.

13. In combination, a driving element, a driven element, a hydraulic transmission operatively interposed between said elements including adjustable means for varying the operation of said transmission to obtain a constant speed of said driven element while the speed of said driving element varies above or below the speed of said driven element, means for adjusting said adjustable means comprising a pair of opposed piston and cylinder devices of unequal cross sectional areas, means for supplying fluid under pressure to said devices including pressure-producing means driven by said driving element, adjustment of said adjustable means as a result of said fluid under pressure acting on said smaller piston and cylinder device serving to decrease the speed of said driven element relative to said driving element and adjustment of said adjustable means by said fluid under pressure acting on said larger piston and cylinder device tending to increase the speed of said driven element relative to said driving element, means for constantly subjecting the smaller of said piston and cylinder devices to said fluid under pressure, and means for supplying said fluid under pressure to the larger piston and cylinder device including a pressure responsive valve means controlling the supply of said fluid to or the discharge of said fluid from said larger piston and cylinder device, and a centrifugal pump generating pressure proportional to the speed of rotation of said driven element connected to act on said pressure responsive valve means to maintain constant the speed of said driven element.

14. In a hydraulic transmission, a pump of the reciprocatory piston type, a motor of the reciprocatory piston type, means providing a closed hydraulic circuit interconnecting the pump and motor, a reservoir for make-up fluid, a pump for drawing fluid from said reservoir and supplying it as make-up fluid to said first named pump, and means for maintaining the fluid in said reservoir at a predetermined pressure above atmospheric pressure.

15. In a hydraulic transmission, a pump of the reciprocatory piston type, a motor of the reciprocatory piston type, means providing a closed hydraulic circuit interconnecting the pump and motor, a reservoir for fluid, a make-up pump operable to draw fluid from said reservoir and discharge the same to said first named pump and said motor to provide make-up fluid and to provide fluid for lubrication purposes, centrifugal means to which the lubricating fluid is returned, said centrifugal means serving as a separator of purely liquid and foamy fluid, and means for controlling the return of the purely liquid fluid to said reservoir to maintain therein a predetermined pressure.

16. In a hydraulic transmission, a pump of the reciprocatory piston type, a motor of the reciprocatory piston type, means providing a closed hydraulic circuit interconnecting the pump and motor, a reservoir for fluid, a make-up pump operable to draw fluid from said reservoir and discharge the same to said first named pump and said motor to provide make-up fluid and to provide fluid for lubrication purposes, centrifugal means to which the lubricating fluid is returned, said centrifugal means serving as a separator of purely liquid and foamy fluid, lubricating spray jets connected to said centrifugal means to receive the foamy fluid, a pressure actuated valve means responsive to the pressure in said reservoir, and a conduit connected at one end to said centrifugal means to be supplied with purely liquid fluid and connected at the other end to said valve means, said valve means controlling said conduit to permit flow of purely liquid fluid to said reservoir when the pressure therein drops below the predetermined value to be maintained.

17. In a transmission, a housing comprising an intermediate casing section having a fluid reservoir at the bottom thereof, a first end closure section and a second end closure section all draining to a common passageway leading to said reservoir, a driving element journaled in said intermediate casing section, a driven element journaled in said second end closure section in axial alignment with said driving element, a hydraulic conversion unit operatively interposed between said elements for driving the driven element at a constant speed while the driving element varies above or below the speed of said driven element comprising an elongated cylinder block rotatably journaled in said intermediate casing section and projecting through openings therein at one end into said first end closure section and at the other end into said second end closure section, means for driving said cylinder block by said driving element, said cylinder block having formed therein a first plurality of annularly arranged pump cylinders concentric with the axis of said cylinder block, a second plurality of annularly arranged motor cylinders, a valve chamber for each plurality of cylinders and a central chamber at all times in communication with both valve chambers, a piston reciprocable in each of said cylinders and at all times projecting through the ends of said cylinders outwardly of opposite ends of said cylinder block, a wheel type valve in each valve chamber, a stationary eccentric mounting said pump valve, a non-rotatable motion converting means acting on the pump pistons and being adjustable to vary the quantity and direction of fluid discharge from the pump to the motor, a second motion converting means associated with said driven element and acted upon by said motor pistons to convert the rotary motion of said cylinder block and the reciprocatory motion of said motor pistons into rotary motion of said driven element, an eccentric mounting said motor valve driven from said second motion converting means, a lubricating oil passage leading from the chambers in said cylinder block to said one end closure section, lubricating and control fluid passages leading from said chambers in said cylinder block to the other end closure section, means for supplying fluid for make-up and lubrication purposes to the chambers in said cylinder block including an auxiliary pump located in said reservoir operable to supply fluid in excess of make-up and lubrication requirements, and valve means also located in said reservoir through which excess fluid is returned to said reservoir operable to maintain a predetermined pressure on the fluid in said chambers, a centrifugal pump housing formed in said reservoir to which the common return passage for the lubricating fluid opens, a centrifugal pump impeller mounted in said housing and operable to separate purely liquid fluid from foamy fluid, lubricating jets through which the foamy fluid and excess liquid fluid is discharged onto the parts within the housing, and pressure actuated valve means connected in circuit with the pump housing in said reservoir and with said reservoir to maintain the pressure in the reservoir at a predetermined value above atmospheric pressure.

18. In a hydraulic transmission, a pump, a motor, means providing a closed hydraulic circuit interconnecting the pump and motor, a reservoir for fluid, a make-up pump operable to draw fluid from said reservoir and discharge the same to said first named pump and said motor to provide make-up fluid and also operable to provide fluid for lubricating purposes, centrifugal means to which the lubricating fluid is returned, said centrifugal means comprising a casing having an annular, inwardly opening groove and an annular chamber, and an impeller rotatable in said casing having a central recess to which the fluid is returned, a first plurality of radial bores communicating with said recess and terminating in an annular passage interconnecting the outer ends of said bores, a plurality of apertures opening through the periphery of said impeller through which purely liquid fluid is discharged from said annular passage to said groove in the casing and a second plurality of radial, slightly axially inclined passages also opening at their inner ends to said recess and discharging at their outer ends to said annular chamber, and means for controlling the return of the purely liquid fluid to said reservoir to maintain therein a predetermined pressure.

GUNNAR A. WAHLMARK.

REFERENCES CITED

The following references are of record in the file of this patent:

UNITED STATES PATENTS

| Number | Name | Date |
|---|---|---|
| 356,496 | Otis | Jan. 25, 1887 |
| 461,671 | Fölsche | Oct. 20, 1891 |
| 1,143,727 | Robson | June 22, 1915 |
| 1,274,391 | Davis | Aug. 6, 1918 |
| 1,585,529 | Boving | May 18, 1926 |
| 1,726,454 | Rayburn | Aug. 27, 1929 |
| 1,840,866 | Rayburn | Jan. 12, 1932 |
| 2,167,623 | Britter | Aug. 1, 1939 |
| 2,255,993 | Wahlmark | Sept. 16, 1941 |
| 2,360,025 | Wahlmark | Oct. 10, 1944 |